(12) United States Patent
Kong et al.

(10) Patent No.: US 11,554,799 B2
(45) Date of Patent: Jan. 17, 2023

(54) METHOD AND APPARATUS FOR CONTROLLING ANTI-YAW DAMPER

(71) Applicant: CRRC QINGDAO SIFANG CO., LTD., Shandong (CN)

(72) Inventors: Haipeng Kong, Shandong (CN); Xu Wang, Shandong (CN); Hongyong Cao, Shandong (CN); Xiaoning Cao, Shandong (CN); Pingyu Zhou, Shandong (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 43 days.

(21) Appl. No.: 17/276,335

(22) PCT Filed: Sep. 9, 2019

(86) PCT No.: PCT/CN2019/104842
§ 371 (c)(1),
(2) Date: Mar. 15, 2021

(87) PCT Pub. No.: WO2020/211266
PCT Pub. Date: Oct. 22, 2020

(65) Prior Publication Data
US 2022/0001904 A1 Jan. 6, 2022

(30) Foreign Application Priority Data
Apr. 19, 2019 (CN) .......................... 201910318241.3

(51) Int. Cl.
*B61F 5/24* (2006.01)
*F16F 9/504* (2006.01)
*F16F 9/512* (2006.01)

(52) U.S. Cl.
CPC .............. *B61F 5/245* (2013.01); *F16F 9/504* (2013.01); *F16F 9/512* (2013.01);
(Continued)

(58) Field of Classification Search
CPC . B61F 5/245; F16F 9/504; F16F 9/512; F16F 2230/183; F16F 2230/0047; F16F 2230/08; F16F 2232/02; F16F 2222/12
See application file for complete search history.

(56) References Cited

FOREIGN PATENT DOCUMENTS

| CN | 101392809 A | * | 3/2009 | .............. B61F 5/245 |
| CN | 103851121 A | | 6/2014 | |

(Continued)

OTHER PUBLICATIONS

China National Intellectual Property Administration, International Search Report issued in corresponding Application No. PCT/CN2019/104842 dated Jan. 22, 2020.

(Continued)

*Primary Examiner* — Vishal R Sahni
(74) *Attorney, Agent, or Firm* — Stites & Harbison, PLLC; Jeffrey A. Haeberlin (57) ABSTRACT

Provided is a method for controlling an anti-yaw damper, including: obtaining lateral acceleration signals of a frame and performing a first preprocessing on the lateral acceleration signals; obtaining a pressure difference between two chambers of an anti-yaw damper piston and performing a second preprocessing of the pressure difference; obtaining an MPPT algorithm objective function value at the current moment and an MPPT algorithm objective function value at the previous moment according to first preprocessing results and second preprocessing results, and comparing the MPPT algorithm objective function value at the current moment with the MPPT algorithm objective function value at the previous moment; and controlling the adjustment direction of an electromagnetic proportional valve of the anti-yaw damper according to the comparison result. According to the method, the damping force of the anti-yaw damper can be adjusted in real time, therefore the adaptability of the
(Continued)

damper in different wheel wear conditions and the kinetic stability of a motor train unit are improved. Also provided is an apparatus for controlling an anti-yaw damper.

14 Claims, 3 Drawing Sheets

(52) U.S. Cl.
CPC ... *F16F 2222/12* (2013.01); *F16F 2230/0047* (2013.01); *F16F 2230/08* (2013.01); *F16F 2230/183* (2013.01); *F16F 2232/02* (2013.01)

(56) References Cited

FOREIGN PATENT DOCUMENTS

| | | |
|---|---|---|
| CN | 104787074 A | 7/2015 |
| CN | 105160104 A | 12/2015 |
| CN | 105818634 A | 8/2016 |
| CN | 105835649 A | 8/2016 |
| CN | 106594148 A | 4/2017 |
| CN | 106828123 A | 6/2017 |
| CN | 106981878 A | 7/2017 |
| CN | 107401843 A | 11/2017 |
| CN | 108036012 A | 5/2018 |
| CN | 108533362 A | 9/2018 |
| CN | 109606394 A | 4/2019 |
| CN | 110091888 A | 8/2019 |
| EP | 0992415 A1 * | 4/2000 |
| KR | 10-2017-0108195 A | 9/2017 |
| RU | 2669909 C1 * | 10/2018 ............ B60G 17/08 |
| WO | 2013/075144 A1 | 5/2013 |

OTHER PUBLICATIONS

The State Intellecutal Property Office of People's Republic of China, First Office Action issued in corresponding Application No. CN 2019103182413 dated Nov. 29, 2019.

The State Intellecutal Property Office of People's Republic of China, First Search issued in corresponding Application No. CN 2019103182413 dated Apr. 19, 2019.

* cited by examiner

METHOD AND APPARATUS FOR CONTROLLING ANTI-YAW DAMPER

CROSS-REFERENCE TO RELATED APPLICATION

The present application claims priority to Chinese application No. 201910318241.3 filed on Apr. 19, 2019, entitled "Method and Apparatus for Controlling Anti-Yaw Damper", which is hereby incorporated by reference in its entirety.

FIELD OF TECHNOLOGY

The present disclosure relates to the field of damper control, in particular to a method and apparatus for controlling an anti-yaw damper.

BACKGROUND

With the social progresses and economic development, transportation industry has profoundly impacted the life of ordinary people. Railway transportation is a main force of the transportation in China. As one of the traction powers of railway transportation, electric locomotive is developing rapidly.

One of the key factors to ensure the safe operation of locomotives is the bogie, which plays a very important role in the safety, comfort, operational reliability of the locomotives, as well as reducing the dynamic force on the tracks and reducing the environmental pollution. An anti-yaw damper is one of the important components to maintain the stability of the bogie, and its parameter matching is also one of the key factors of train operation safety.

With the increase in vehicle-miles of travel, the equivalent conicity of a wheel tread is increasing, which leads to the continual increase of yaw frequency of train, and the required secondary rotation resistance moment is also increasing. It is very difficult for traditional anti-yaw dampers with nonadjustable damping to adapt to the different wear states of wheels. In order to improve the adaptability of wheels to different wear degrees and increase the stability of train operation, it is very necessary to develop a control method for anti-yaw damper with an active control.

The MPPT algorithm first appeared in the photovoltaic field, where MPPT means "maximum power point tracking". The core principle of the algorithm is: the maximum power point can be effectively tracked under rapidly changing conditions, so that the controlled objects can operate at the maximum power point as much as possible. MPPT algorithm has been widely used since its inception, but to date, no application of the MPPT algorithm in the control of anti-yaw damper has been found.

SUMMARY

Embodiments of the present disclosure provide a method and an apparatus for controlling an anti-yaw damper, in which the damping force of the anti-yaw damper is adjusted in real time during vehicle operation based on the MPPT algorithm's control, so as to improve the stability of train operation.

An embodiment of the present disclosure provides a method for controlling an anti-yaw damper, including:

obtaining lateral acceleration signals of a frame and performing a first preprocessing on the lateral acceleration signals;

obtaining a pressure difference between two chambers of a piston of an anti-yaw damper and performing a second preprocessing on the pressure difference;

obtaining an MPPT algorithm objective function value at the current moment and an MPPT algorithm objective function value at the previous moment according to first preprocessing results and second preprocessing results, and comparing the MPPT algorithm objective function value at the current moment with the MPPT algorithm objective function value at the previous moment; and controlling the direction of an electromagnetic proportional valve of the anti-yaw damper according to the comparison result.

An embodiment of the present disclosure provides an apparatus for controlling an anti-yaw damper, including:

a first preprocessor configured to obtain lateral acceleration signals of a frame and performing a first preprocessing on the lateral acceleration signals;

a second preprocessor configured to obtain a pressure difference between two chambers of a piston of an anti-yaw damper and perform a second preprocessing on the pressure difference;

a comparer configured to obtain an MPPT algorithm objective function value at the current moment and an MPPT algorithm objective function value at the previous moment according to first preprocessing results and second preprocessing results, and compare the MPPT algorithm objective function value at the current moment with the MPPT algorithm objective function value at the previous moment; and a controller configured to control the direction of an electromagnetic proportional valve of the anti-yaw damper according to the comparison result.

An embodiment of the present disclosure provides an electronic device, including a memory, a processor and computer programs stored in the memory and executable on the processor. The processor implements steps of the method for controlling an anti-yaw damper provided by the embodiments of the present disclosure when executing the programs.

An embodiment of the present disclosure provides a non-transitory computer-readable storage medium, in which computer programs are stored, where steps of the method for controlling an anti-yaw damper provided by the embodiments of the present disclosure are implemented when the computer programs are executed by a processor.

In the method and the apparatus for controlling an anti-yaw damper according to the embodiments of the present disclosure, by collecting the lateral vibration acceleration signals of the frame and the signals of the two chambers of the piston of the anti-yaw damper, the MPPT algorithm with the lateral acceleration of the frame and the hydraulic pressure of the anti-yaw damper as control objects is used to adjust the damping force of the anti-yaw damper in real-time, so as to improve the adaptability of the anti-yaw damper under different wheel wear conditions, thereby improving the kinetic stability of the motor train unit.

BRIEF DESCRIPTION OF THE DRAWINGS

In order to illustrate more clearly the technical solutions in the embodiments of the present disclosure or the prior art, the drawings needed in the description of the embodiments or the prior art will be described below. Obviously, the drawings in the following description are some embodiments of the present disclosure. For those of ordinary skill in the art, other drawings can be obtained according to these drawings paying creative labor.

DETAILED DESCRIPTION

In order to make the objectives, technical solutions and advantages of the embodiments of the present disclosure clearer, the technical solutions in the embodiments of the present disclosure will be described clearly and completely in conjunction with the drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work belong to the protection scope of the present disclosure.

Figure 1:
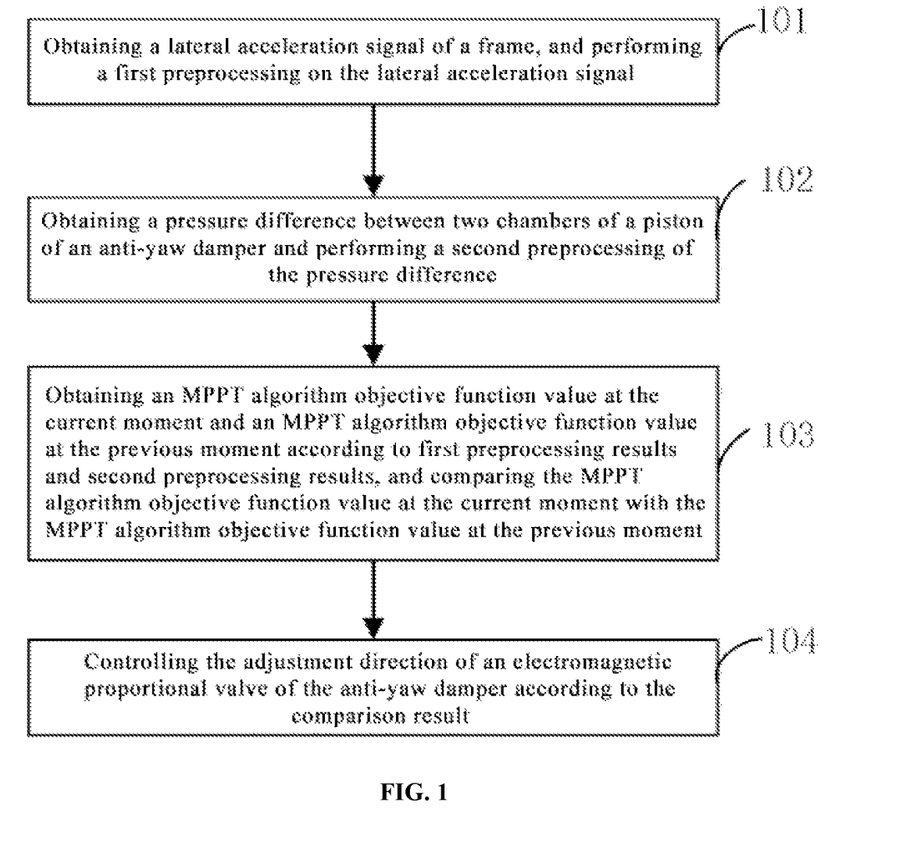
FIG. 1 is a flow chart of a method for controlling an anti-yaw damper according to an embodiment of the present disclosure.

As shown in FIG. 1, a method for controlling an anti-yaw damper according to an embodiment of the present disclosure includes:

Step 101, obtaining lateral acceleration signals of a frame and performing a first preprocessing on the lateral acceleration signals.

Figure 2:
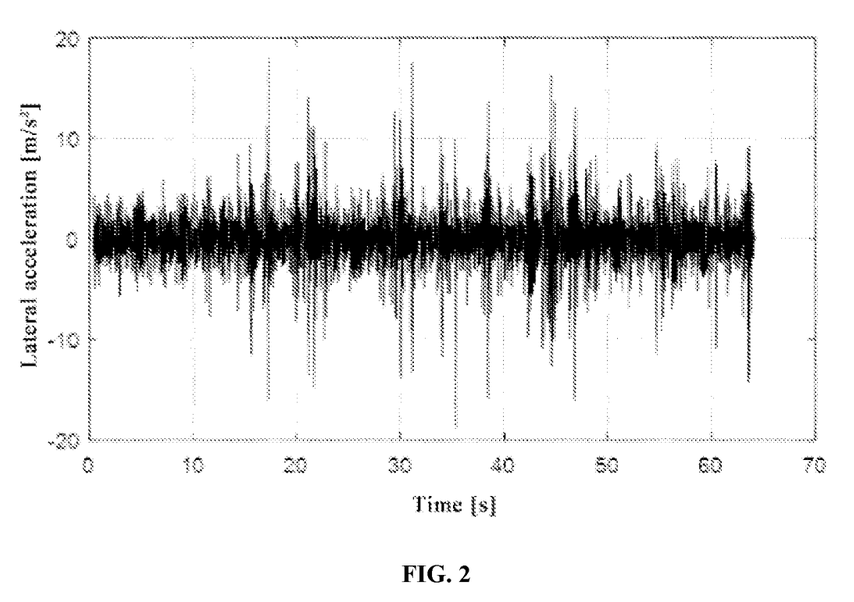
FIG. 2 is an oscillograph of a lateral acceleration of a frame according to an embodiment of the present disclosure.

FIG. 2 shows lateral vibration acceleration data of a frame collected by acceleration sensors. In FIG. 2, the horizontal axis is time and the vertical axis is the lateral acceleration value of the frame. The sampling time interval depends on the sampling frequency of the acceleration sensors, and expressed a reciprocal relationship to the sampling frequency. For example, when the sampling frequency Fs is 100 Hz, 100 acceleration values will be collected within 1 second. In an embodiment of the present disclosure, in order to obtain the parameters required for the subsequent processing, it is necessary to perform a first preprocessing on the lateral acceleration signals, and the preprocessing method may include performing a filtering and a moving average processing on the signals.

Step 102, obtaining a pressure difference between two chambers of a piston of the anti-yaw damper and performing a second preprocessing on the pressure difference.

In an embodiment of the present disclosure, the values of pressure intensity of the two chambers of the piston of the anti-yaw damper are collected by pressure sensors, and the respective pressure values of the two chambers of the piston are calculated according to the respective areas of the two chambers of the piston, so as to obtain the pressure difference between the two chambers of the piston. Because the pressure difference between the two chambers of the piston can be obtained at every moment, the pressure difference is subjected to a second preprocessing. The preprocessing method can include signal filtering and moving average processing.

Step 103, obtaining an MPPT algorithm objective function value at the current moment and an MPPT algorithm objective function value at the previous moment according to first preprocessing results and second preprocessing results, and comparing the MPPT algorithm objective function value at the current moment with the MPPT algorithm objective function value at the previous moment.

The core principle of the MPPT algorithm is: the maximum power point can be effectively tracked under rapidly changing conditions, to make the controlled objects operate at the maximum power point as much as possible. In an embodiment of the present disclosure, when the MPPT algorithm is applied to the damper control of the train, it is necessary to obtain the MPPT algorithm objective function according to the first preprocessing results of the lateral acceleration signals and the second preprocessing results of the pressure difference between the two chambers of the piston in the above steps. In the anti-yaw damper, the damping force of the damper can be adjusted by adjusting the direction of the electromagnetic proportional valve, so as to improve the adaptability of the anti-yaw damper under different wheel wear conditions. In an embodiment of the present disclosure, in order to determine whether to adjust the control direction of the electromagnetic proportional valve, it is necessary to obtain the MPPT objective function value at the current moment and the MPPT objective function value at the previous moment, and compare the two objective function values.

Step 104, controlling the adjustment direction of an electromagnetic proportional valve of the anti-yaw damper.

In the anti-yaw damper, the damping force of the damper can be adjusted by adjusting the control direction of the electromagnetic proportional valve, so as to improve the adaptability of the anti-yaw damper under different wheel wear conditions. In an embodiment of the present disclosure, the adjustment direction of the electromagnetic proportional valve can be controlled by comparing the MPPT objective function value at the current moment with the MPPT objective function value at the previous moment. For example, according to the comparison result of the objective function values, the adjustment direction of the magnetic proportional valve can be maintained or changed.

In the method for controlling an anti-yaw damper according to the embodiments of the present disclosure, by collecting the literal vibration acceleration signals of the frame and the pressure signals of two chambers of the piston of the anti-yaw damper, the MPPT algorithm with the lateral acceleration of the frame and the pressures of two chambers of the piston as control objects is used to control the adjustment direction of the electromagnetic proportional valve of the anti-yaw damper, so as to control the damping force of the anti-yaw damper in real time. Therefore, the adaptability of anti-yaw damper under different wheel wear conditions and the dynamic stability of the motor train unit are improved.

As shown in FIG. 1, in step 101, the first preprocessing of the lateral acceleration of the frame is to be performed. In an embodiment of the present disclosure, the first preprocessing method can be steps a1 to a2 which are not shown in FIG. 1, as follows:

Step a1, performing a band-pass filtering on the lateral acceleration signals of the frame.

In an embodiment of the present disclosure, the acceleration signals are subjected to band-pass filtering according to the EN14363-2016 standard which is a non-mandatory national standard for the railway vehicle operational performance and stability test. In this standard, it is stipulated that band-pass filter $f_0 \pm 2$ Hz is used to filter the signals regarding the judgement conditions of unstable vehicle running. In an embodiment of the present disclosure, based on the lateral acceleration value collected in step 101, the time domain signals are converted into the frequency domain signals by fast Fourier transform. In this step, the most prominent frequency in the Fourier transform spectrum signal, that is, the dominant frequency, is represented by $f_0$. Based on the value of the dominant frequency $f_0$, the lateral acceleration signals are filtered by the band-pass filter $f_0 \pm 2$ Hz, so that only the signals in the 2 Hz range near the dominant frequency are retained.

Step a2, performing a moving average on the lateral acceleration signals filtered in step a1.

Figure 3:
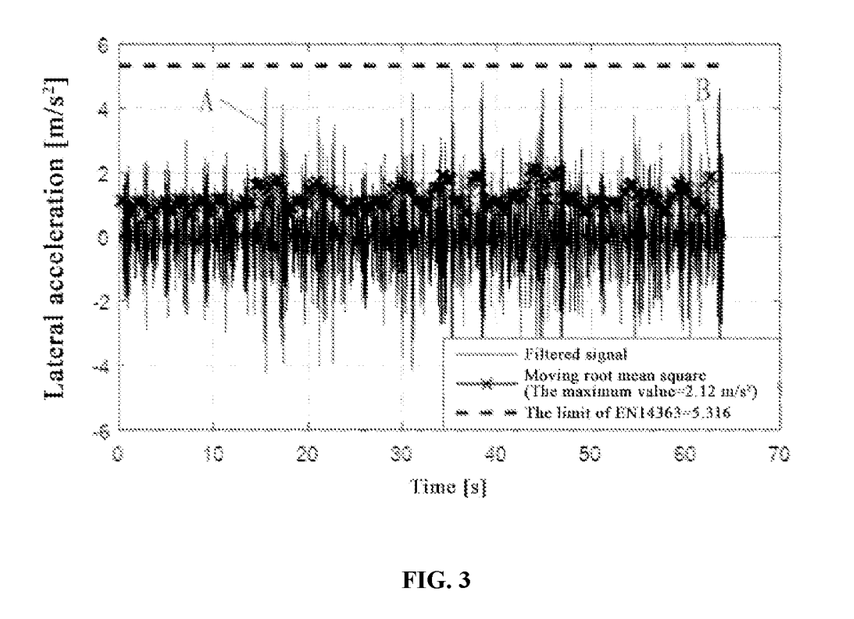
FIG. 3 is an oscillograph of a moving average of a lateral acceleration of a frame according to an embodiment of the present disclosure.

FIG. 3 shows an oscillography of moving average on the lateral acceleration signals in an embodiment of the present disclosure. As shown in FIG. 3, Label A represents the acceleration value subjected to band-pass filtering, and Label B (cross mark) represents the acceleration value subjected to moving average. During the test, the train speed is 280 km/h, i.e. 77.8 m/s, the data window corresponding to 500 m distance, i.e. 500/77.8=6.4 s is taken, in other words, the acceleration window in FIG. 2 is taken as 6.4 s. According to the principle of moving average, the data in the data window is squared, summed and averaged, and then square rooted to obtain the value $$a' = \sqrt{\frac{1}{n}(a_1^2 + \ldots + a_n^2)}$$

for replacing the original acceleration value, where a' represents the acceleration value subjected to moving average, $a_1, a_2, \ldots a_n$ represent the n collected acceleration values, and n represents the number. The window is moved in turn, the values in the window are subjected to moving average for replacing the current value, thereby obtaining the final moving average lateral acceleration value.

In an embodiment of the present disclosure, according to the provisions of the EN14363-2016 standard, the signals in the 2 Hz range near the dominant frequency of the lateral acceleration signals are retained by band-pass filtering, and other low-frequency interference signals are removed. Then the data window is used to perform a moving average on the filtered signal, thereby eliminating the accidental fluctuation factors. Moreover, the signals are processed using moving average which is a simple algorithm with less computational effort, enabling fast and real-time processing of non-stationary data.

As shown in FIG. 1, in step 102, the pressure difference between the two chambers of the piston of the anti-yaw damper is to be obtained, and the pressure difference is subjected to a second preprocessing. In an embodiment of the present disclosure, steps b1 to b3, which are not shown in FIG. 1, can be taken to obtain the pressure difference between the two chambers of the piston of the anti-yaw damper and perform the second preprocessing of the pressure difference signals. The specific steps are as follows:

Step b1, collecting pressure intensity signals of the two chambers of the piston of the anti-yaw damper and areas of the two chambers of the piston to obtain the respective pressures of the two chambers of the piston.

In an embodiment of the present disclosure, the areas of the two chambers of the piston of the anti-yaw damper are set as $S_1$ and $S_2$ respectively, and the pressure intensity values collected by the pressure sensors at each moment are $P_1$ and $P_2$ respectively. The pressure intensity is multiplied by the area to obtain the pressure value, so that the respective pressure values of the two chambers of the piston at each moment can be obtained.

Step b2, calculating the pressure difference between the two chambers of the piston and performing a low-pass filtering on the pressure difference.

According to the respective pressure values of the two chambers of the piston of the anti-yaw damper at each time obtained in step b1, the pressure difference between the two chambers of the piston at each time is calculated, and the pressure difference is subjected to low-pass filtering; the cut-off frequency is taken as $f_t$, that is, noise signals with frequencies greater than $f_t$ are filtered out.

Step b3, performing a moving average on the filtered pressure difference, setting the pressure difference subjected to the moving average as a damping force output by the anti-yaw damper.

In an embodiment of the present disclosure, a moving average is performed on the filtered pressure difference in the same way as in step a2, and the result of the moving average is taken as the damping force F output by the anti-yaw damper.

In an embodiment of the present disclosure, the high-frequency components of the signal are removed by performing the low-pass filtering on the pressure difference signal to achieve smooth denoising. A data window is then used to perform a moving average on the filtered signal, so as to eliminate the accidental fluctuation factors. Moreover, it is simple in algorithm and small in calculation amount to process the signals by moving average, and the non-stationary data can be processed quickly and in real-time.

As shown in FIG. 1, in step 103, the MPPT algorithm objective function value at the current moment and the MPPT algorithm objective function value at the previous moment are obtained according to the first preprocessing results and the second preprocessing results, and the MPPT algorithm objective function value at the current moment is compared with the MPPT algorithm objective function value at the previous moment. In an embodiment of the present disclosure, steps c1 to c2, which are not shown in FIG. 1, can be taken to obtain the MPPT objective function value and compare the objective function value of at current moment and that of the previous moment. The specific steps are as follows:

Step c1, obtaining the objective function J(T) of the MPPT algorithm at the current moment t, where J(t) =w1*La2+w2*F2, w1 represents a weight of the lateral acceleration of the frame, w2 represents a weight of the damping force, La represents the lateral acceleration value subjected to the moving average, and F represents the damping force.

The core principle of the MPPT algorithm is: the maximum power point can be effectively tracked under rapidly changing conditions, to make the controlled objects operate at the maximum power point as much as possible. In an embodiment of the present disclosure, when the MPPT algorithm is applied to the damper control of the train, the objective function J(t) of the algorithm should be redesigned. In an embodiment of the present disclosure, the objective function J(t)=w1*La2+w2*F2, where w1 represents the weight of the lateral acceleration of the frame, w2 represents the weight of the damping force, La represents the lateral acceleration value after moving average, and F represents the damping force.

Step c2, comparing the objective function value J(t) with the objective function value J(t−1) at the previous moment.

In the anti-yaw damper, the damping force of the damper may be adjusted by adjusting the electromagnetic proportional valve, so as to improve the adaptability of the anti-yaw damper under different wheel wear conditions. In an embodiment of the present disclosure, in order to determine the adjustment direction of the electromagnetic proportional valve, it is necessary to obtain the objective function value J(t) at the current moment and the objective function value J(t−1) at the previous moment, and compare the two objective function values.

In an embodiment of the present disclosure, an objective function with lateral acceleration and damping force as the control objects is established according to the principle of the MPPT algorithm, so that the damping force of the anti-yaw damper can be adjusted by comparing the objective function values.

As shown in FIG. 1, in step 104, the adjustment direction of the electromagnetic proportional valve of the anti-yaw damper may be controlled according to the comparison result between the MPPT objective function value at the current moment and the MPPT objective function value at the previous moment. In an embodiment of the present disclosure, according to the comparison result between MPPT objective function values, there are two different control modes for the adjustment direction of the electromagnetic proportional valve.

Mode 1, when J(t) is less than J(t−1), the adjustment direction of the electromagnetic proportional valve of the anti-yaw damper remains unchanged.

In an embodiment of the present disclosure, if the objective function value J(t) at the current moment is less than the objective function value J(t−1) at the previous moment, that is, when the objective function value becomes smaller, the current adjustment direction of the electromagnetic proportional valve of the anti-yaw damper should be maintained, so that the lateral acceleration of the frame and the damping force output by the anti-yaw damper continue to decrease, thereby ensuring the stability of operation.

Mode 2, when J(t) is equal to or greater than J(t−1), the adjustment direction of the electromagnetic proportional valve of the anti-yaw damper is changed.

In an embodiment of the present disclosure, if the objective function value J(t) at the current moment is greater than the objective function value J(t−1) at the previous moment, that is, when the objective function value becomes larger, the adjustment direction of the electromagnetic proportional valve of the anti-yaw damper should be changed to reduce the lateral acceleration of the frame and the damping force output by the anti-yaw damper, thereby improving the stability of operation.

In an embodiment of the present disclosure, according to the principle of the MPPT algorithm, an objective function with lateral acceleration and damping force as the control objects is established. When the objective function value becomes smaller, the adjustment direction of the electromagnetic proportional valve is maintained, so that the lateral acceleration of the frame and the damping force output by the anti-yaw damper continue to decrease. When the objective function value becomes larger, the adjustment direction of the electromagnetic proportional valve is changed to reduce the lateral acceleration of the frame and the damping force output by the anti-yaw damper. The damping force of the damper is adjusted in real time based on the change of the objective function value to ensure that the train runs in a stable state.

In order to verify the effectiveness of the method provided by the embodiments of the present disclosure, during the test process, when the vehicle runs in a straight line, the relevant data is collected and processed according to the method provided by the embodiments of the present disclosure to control the lateral acceleration of the frame and the damping force of the damper. At this time, the lateral force of the axle and the lateral acceleration of the frame are monitored, and the monitoring results are compared with the limits of vehicle stability of the EN14363 standard, so that the stability of the vehicle is determined.

In the EN14363 standard, the limit of axle lateral force is:

$$\sum Y_{lim} = 10 + \frac{P}{3},$$

where, P is the weight of an axle. The limit of the lateral acceleration of the frame is:

$$\ddot{y}^+_{lim} = 12 - \frac{m_b}{5},$$

where, $m_b$ is the weight of a bogie.

During the test, four axles WS1 to WS4 of a carriage are monitored. The monitoring results show that when no MPPT control algorithm is adopted, the lateral forces and the accelerations of the four axles all exceed the limits of the EN14363 standard as the vehicle speed reaches about 330 km/h, so the vehicle runs unstably.

When the MPPT control algorithm is adopted, and when the weight of the lateral acceleration w1 of the frame is taken as 1 and the weight w2 of the damping force of the damper is taken as 1, at a speed level of 300 km/h to 400 km/h, the lateral force of the axle and the lateral acceleration of the frame are within the limits of the EN14363 standard, so the vehicle can run stably.

When the weight w2 of the damping force of the damper is 0, the objective function J(t) in the above-mentioned step 107 only takes the lateral acceleration of the frame as the control object. When the vehicle speed is 300 km/h to 400 km/h, the lateral force of the axle and the lateral acceleration of the frame are within the limits of the EN14363 standard, and the vehicle can run stably.

Figure 4:
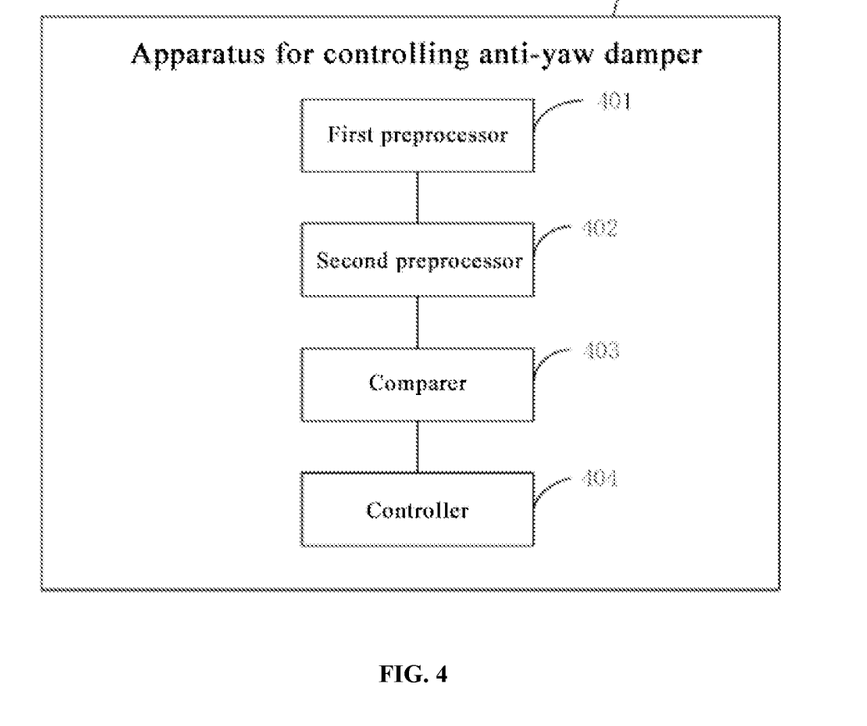
FIG. 4 is a block diagram of an apparatus for controlling an anti-yaw damper according to an embodiment of the present disclosure.

FIG. 4 illustrates an apparatus for controlling an anti-yaw damper according to an embodiment of the present disclosure. As shown in FIG. 4, the apparatus for controlling an anti-yaw damper 400 includes:

a first preprocessor 401, configured to obtain lateral acceleration signals of a frame and perform a first preprocessing on the lateral acceleration signals;

a second preprocessor 402, configured to obtain a pressure difference between two chambers of the piston of the anti-yaw damper and perform a second preprocessing on the pressure difference;

a comparer 403, configured to obtain an MPPT algorithm objective function value at the current moment and an MPPT algorithm objective function value at the previous moment according to the first preprocessing results and the second preprocessing results, and compare the MPPT algorithm objective function value at the current moment with the MPPT algorithm objective function value at the previous moment; and a controller 404, configured to control the adjustment direction of an electromagnetic proportional valve of the anti-yaw damper according to the comparison result.

Figure 5:
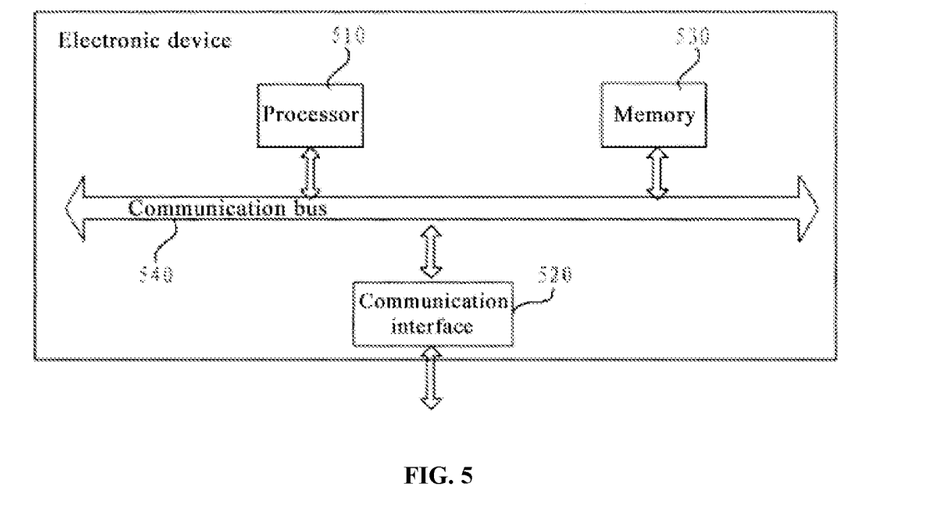
FIG. 5 is a schematic diagram of the physical structure of an electronic device according to an embodiment of the present disclosure.

The apparatus for controlling an anti-yaw damper based on MPPT algorithm described in the embodiment can be used to implement the above-mentioned method embodiments with similar principles and technical effects, so the apparatus embodiment will not be repeated here FIG. 5 illustrates a schematic diagram of the physical structure of an electronic device according to an embodiment of the present disclosure. As shown in FIG. 5, the electronic device may include: a processor 510, a communication interface 520, a memory 530 and a communication bus 540, where processor 510, the communication interface 520 and the memory 530 communicate with each other through the communication bus 540. The processor 510 can call the logic instructions in the memory 530 to execute the above-mentioned method embodiments with similar principles and technical effects, so the apparatus embodiment will not be repeated here.

In addition, the logic instructions in the memory 530 can be implemented in the form of software functional units, and can be stored in a computer readable storage medium when sold or used as independent products. The technical solutions of the present disclosure or the part of the technical solutions can be embodied in the form of a software product, which is stored in a storage medium and includes several instructions to enable a computer device (which can be a personal computer, a server, a network device, etc.) to perform all or part of the steps of the method in various embodiments of the present disclosure. The above-mentioned storage media include: U disk, mobile hard disk, read only memory (ROM), random access memory (RAM), magnetic disk, compact disk and other media that can store program code.

An embodiment of the present disclosure provides a non-transitory computer-readable storage medium. The non-transitory computer-readable storage medium stores computer instructions which cause a computer to execute the methods provided by the above-mentioned method embodiments with similar principles and technical effects, so the apparatus embodiment will not be repeated here.

The above-mentioned apparatus embodiments are merely illustrative, wherein, the units described as separate components may or may not be physically separated, and the components displayed as units may or may not be physical units, that is, they may be located at one place or distributed across multiple network units. Some or all of the modules may be selected according to the actual needs to achieve the purpose of the embodiments. Those of ordinary skill in the art can understand and implement them without paying creative labor.

Through the above description of implementation methods, those of ordinary skill in the art can clearly understand that the various embodiments can essentially or the part contributing to the prior art can be implemented by means of software and necessary general hardware platform, and of course, by means of hardware. Based on such understanding, a part of the technical solutions, which is essential or contributes to the prior art can be embodied in the form of software products. The software products can be stored in computer-readable storage media, such as ROM/RAM, magnetic disk, compact disk, including several instructions to cause a computer device (which can be a personal computer, server, or network device) to perform the methods described in various embodiments or a part of the embodiments.

Finally, it should be noted that the above embodiments are only used to illustrate the technical solutions of the present disclosure, not to limit them; although the present disclosure has been described in detail with reference to the above-mentioned embodiments, those of ordinary skill in the art should understand that they can still modify the technical solutions recorded in the above-mentioned embodiments, or make equivalent substitutions to a part of the technical features therein; these modifications or substitutions do not separate the essence of the corresponding technical solutions from the spirit and scope of the technical solutions of the embodiments of the present disclosure.

What is claimed is:

1. A method for controlling an anti-yaw damper, comprising:
    obtaining lateral acceleration signals of a frame and performing a first preprocessing on the lateral acceleration signals;
    obtaining a pressure difference between two chambers of a piston of the anti-yaw damper and performing a second preprocessing on the pressure difference;
    obtaining an MPPT algorithm objective function value at a first moment and an MPPT algorithm objective function value at a second moment according to first preprocessing results and second preprocessing results, and comparing the MPPT algorithm objective function value at the first moment with the MPPT algorithm objective function value at the second moment; and
    controlling the adjustment direction of an electromagnetic proportional valve of the anti-yaw damper according to the comparison result,
    wherein
        the first preprocessing comprises:
            performing a band-pass filtering on the lateral acceleration signals; and
            performing a moving average on the filtered lateral acceleration signals;
        the second preprocessing comprises:
            collecting pressure intensity signals and areas of the two chambers of the piston of the anti-yaw damper to obtain respective pressures of the two chambers of the piston;
            calculating the pressure difference between the two chambers of the piston and performing a low-pass filtering on the pressure difference; and
            performing a moving average on the filtered pressure difference, and setting the pressure difference subjected to the moving average as a damping force output by the anti-yaw damper;
        the first preprocessing results are results obtained after performing the first preprocessing;
        the second preprocessing results are results obtained after performing the second preprocessing; and
        the comparison result is a result obtained after comparing the MPPT algorithm objective function value at the first moment with the MPPT algorithm objective function value at the second moment.

2. The method for controlling an anti-yaw damper of claim 1, wherein the obtaining an MPPT algorithm objective function value at the first moment and an MPPT algorithm objective function value at the second moment according to first preprocessing results and second preprocessing results, and comparing the MPPT algorithm objective function value at the current first moment with the MPPT algorithm objective function value at the previous second moment specifically comprises:
    obtaining the MPPT algorithm objective function $J(t)$ at the first moment t, wherein $J(t)=w1*La^2+w2*F^2$, $w1$ represents the weight of the lateral acceleration, $w2$ represents the weight of the damping force, La represents the lateral acceleration signals after the moving average, and F represents the damping force; and comparing the objective function value J(t) with the objective function value J(t−1) at the second moment.

3. The method for controlling an anti-yaw damper of claim 2, wherein the controlling the adjustment direction of an electromagnetic proportional valve of the anti-yaw damper according to the comparison result specifically comprises:
remaining the adjustment direction of the electromagnetic proportional valve of the anti-yaw damper unchanged when J(t) is less than J(t−1); or
changing the adjustment direction of the electromagnetic proportional valve of the anti-yaw damper when J(t) is equal to or greater than J(t−1).

4. The method for controlling an anti-yaw damper of claim 1, wherein a band-pass filter $f_0 \pm 2$ Hz is used to perform the band-pass filtering on the lateral acceleration signals, and $f_0$ represents the dominant frequency.

5. The method for controlling an anti-yaw damper of claim 1, wherein the performing a moving average on the filtered lateral acceleration signals specifically comprises: setting a data window, moving the data window in the filtered lateral acceleration signals, and performing a moving average on the values in the data window.

6. An electronic device, comprising a memory, a processor and computer programs stored in the memory and executable on the processor, wherein the processor is configured to implement steps of the method for controlling an anti-yaw damper according to claim 1 when executing the computer programs.

7. A non-transitory computer-readable storage medium, in which computer programs are stored, wherein steps of the method for controlling an anti-yaw damper according to claim 1 are implemented when the computer programs are executed by a processor.

8. An electronic device, comprising a memory, a processor and computer programs stored in the memory and executable on the processor, wherein the processor is configured to implement steps of the method for controlling an anti-yaw damper according to claim 2 when executing the computer programs.

9. An electronic device, comprising a memory, a processor and computer programs stored in the memory and executable on the processor, wherein the processor is configured to implement steps of the method for controlling an anti-yaw damper according to claim 3 when executing the computer programs.

10. An electronic device, comprising a memory, a processor and computer programs stored in the memory and executable on the processor, wherein the processor is configured to implement steps of the method for controlling an anti-yaw damper according to claim 4 when executing the computer programs.

11. A non-transitory computer-readable storage medium, in which computer programs are stored, wherein steps of the method for controlling an anti-yaw damper according to claim 2 are implemented when the computer programs are executed by a processor.

12. A non-transitory computer-readable storage medium, in which computer programs are stored, wherein steps of the method for controlling an anti-yaw damper according to claim 3 are implemented when the computer programs are executed by a processor.

13. A non-transitory computer-readable storage medium, in which computer programs are stored, wherein steps of the method for controlling an anti-yaw damper according to claim 4 are implemented when the computer programs are executed by a processor.

14. An apparatus for controlling an anti-yaw damper, comprising:
a first preprocessor configured to obtain lateral acceleration signals of a frame and perform a first preprocessing of the lateral acceleration signals;
a second preprocessor configured to obtain a pressure difference between two chambers of the anti-yaw damper piston and perform a second preprocessing on the pressure difference;
a comparer configured to obtain an MPPT algorithm objective function value at a first moment and an MPPT algorithm objective function value at a second moment according to first preprocessing results and second preprocessing results, and compare the MPPT algorithm objective function value at the first moment with the MPPT algorithm objective function value at the second moment; and
a controller configured to control the adjustment direction of an electromagnetic proportional valve of the anti-yaw damper according to the comparison result,
wherein
the first preprocessing comprises:
performing a band-pass filtering on the lateral acceleration signals; and
performing a moving average on the filtered lateral acceleration signals;
the second preprocessing comprises:
collecting pressure intensity signals and areas of the two chambers of the piston of the anti-yaw damper to obtain respective pressures of the two chambers of the piston;
calculating the pressure difference between the two chambers of the piston and performing a low-pass filtering on the pressure difference; and
performing a moving average on the filtered pressure difference, and setting the pressure difference subjected to the moving average as a damping force output by the anti-yaw damper;
the first preprocessing results are results obtained after performing the first preprocessing;
the second preprocessing results are results obtained after performing the second preprocessing; and
the comparison result is a result obtained after comparing the MPPT algorithm objective function value at the first moment with the MPPT algorithm objective function value at the second moment.

\* \* \* \* \*

UNITED STATES PATENT AND TRADEMARK OFFICE
CERTIFICATE OF CORRECTION

PATENT NO. : 11,554,799 B2
APPLICATION NO. : 17/276335
DATED : January 17, 2023
INVENTOR(S) : Haipeng Kong et al.

It is certified that error appears in the above-identified patent and that said Letters Patent is hereby corrected as shown below:

In the Claims

Claim 2, Column 10, Line 63, delete "previous"

Signed and Sealed this
Seventh Day of March, 2023

Katherine Kelly Vidal
*Director of the United States Patent and Trademark Office*